(12) United States Patent  
Liesener et al.

(10) Patent No.: US 7,771,063 B2
(45) Date of Patent: Aug. 10, 2010

(54) EXTERIOR REARVIEW MIRROR FOR VEHICLES, PREFERABLY FOR MOTOR VEHICLES

(75) Inventors: Alf Liesener, Schorndorf (DE); Gernot Michael Bracht, Munich (DE)

(73) Assignee: SMR Patents S.a.r.l., Luxembourg (LU)

( * ) Notice: Subject to any disclaimer, the term of this patent is extended or adjusted under 35 U.S.C. 154(b) by 76 days.

(21) Appl. No.: 11/941,107

(22) Filed: Nov. 16, 2007

(65) Prior Publication Data

US 2008/0174893 A1 Jul. 24, 2008

(30) Foreign Application Priority Data

Nov. 20, 2006 (DE) .................. 10 2006 056 069

(51) Int. Cl.
*G02B 7/182* (2006.01)
*B60R 1/06* (2006.01)
*B60R 1/12* (2006.01)
*B60Q 1/26* (2006.01)

(52) U.S. Cl. ..................................... 359/841; 362/494
(58) Field of Classification Search ............... 359/841, 359/872; 362/494
See application file for complete search history.

(56) References Cited

U.S. PATENT DOCUMENTS

| 1,499,640 | A | * | 7/1924 | Copeland | 362/494 |
| 2,595,331 | A | * | 5/1952 | Calihan et al. | 362/494 |
| 4,112,486 | A | * | 9/1978 | Tovi | 362/419 |
| 4,353,110 | A | * | 10/1982 | Ellis | 362/35 |
| 4,809,137 | A | * | 2/1989 | Yamada | 362/494 |
| 4,916,430 | A | | 4/1990 | Vu et al. | |
| 5,089,314 | A | | 2/1992 | Masujima et al. | |
| 5,497,306 | A | | 3/1996 | Pastrick | |
| 5,669,698 | A | * | 9/1997 | Veldman et al. | 362/494 |
| 5,774,283 | A | * | 6/1998 | Nagel et al. | 359/838 |
| 5,851,064 | A | * | 12/1998 | Lyons | 362/494 |
| 5,892,438 | A | | 4/1999 | Vaughn | |
| 5,938,320 | A | | 8/1999 | Crandall | |
| 5,938,322 | A | * | 8/1999 | Alonzo et al. | 362/494 |
| 6,039,448 | A | * | 3/2000 | Oprea | 359/850 |
| 6,049,271 | A | * | 4/2000 | Chu | 340/463 |
| 6,250,784 | B1 | * | 6/2001 | Kayama | 362/494 |
| 6,568,839 | B1 | * | 5/2003 | Pastrick et al. | 362/494 |
| 7,121,701 | B2 | * | 10/2006 | Liu et al. | 362/504 |
| 2003/0193815 | A1 | * | 10/2003 | Mishimagi | 362/522 |
| 2004/0190303 | A1 | * | 9/2004 | Mishimagi | 362/494 |

FOREIGN PATENT DOCUMENTS

DE 10338797 3/2005
JP 03050044 * 3/1991
WO WO 01/59734 A1 8/2001

OTHER PUBLICATIONS

European Search Report for EP 07022000; Feb. 12, 2008.

* cited by examiner

*Primary Examiner*—Ricky D Shafer
(74) *Attorney, Agent, or Firm*—Reising Ethington P.C.

(57) ABSTRACT

The exterior rearview mirror is comprised of a mirror housing, having at least one transparent light window, behind which at least one light is disposed, comprising at least one illuminant, whose light passes through the light window to the outside. In order provide the exterior rearview mirror so that different light functions and light directions can be performed by the light, at least a portion of the light is disposed adjustable.

9 Claims, 5 Drawing Sheets

EXTERIOR REARVIEW MIRROR FOR VEHICLES, PREFERABLY FOR MOTOR VEHICLES

BACKGROUND OF THE INVENTION

The invention is based on a priority patent application DE 10 2006 056 069.8 which is hereby incorporated by reference.

The invention relates to an exterior rearview mirror for vehicles, preferably for motor vehicles, comprising a mirror housing, having at least one light window, behind which at least one light is disposed, comprising at least one illuminant, wherein the light passes through the light window to the outside, wherein at least a portion of the light is disposed adjustable.

Exterior rearview mirrors are known, in which a cutout is provided in the mirror housing, in which the light pane of a light is disposed. Such mirror lights comprise a housing with a reflector, an illuminant disposed in front of the reflector, and a light pane. Such lights are formed as closed systems, which are installed into the exterior rearview mirror as complete units. They comprise an emission of the light, radiating from the illuminant, which is adapted according to the reflector, or according to optics, which are additionally used. They are turned on and off, and can perform the function of a position light as a continuous light, or they can be used as a turn indicator, when operated repeatedly.

From U.S. Pat. No. 5,497,306, a signal light module for an exterior rearview mirror assembly for a vehicle is known. For illuminating the lateral periphery of the roadway, a light is installed from below at a slant angle into the interior mirror housing. The light is comprised of a light housing, which is covered by a light pane, and which closes flush with the circumferential mirror housing. The light emitted by the illuminant is emitted downward at a slant angle in the direction of the roadway in the area of the driver door due to the alignment of the light housing. Another light is integrated in this embodiment in the lower rim of the mirror frame. Herein, the illuminant is an LED, emitting the light in opposite direction to the driving direction. This light can serve as a position light for the subsequent traffic and as a turn indicator.

Also, an exterior rearview mirror for vehicles is known (DE 103 38 797 A1), comprising a light for illuminating a lateral periphery/the roadway. The exterior rearview mirror comprises a mirror base and an opposed pivotable mirror head. In the separation area between the mirror base and the mirror head a light is provided. It is mounted at an intermediary support, disposed between the mirror base and the mirror head, and can protrude far into the mirror head, depending on its dimensions. This periphery illumination can be combined with a light, serving as a turn indicator, in the same mirror housing.

SUMMARY OF THE INVENTION

It is the object of the invention to provide the exterior rearview mirror of this type, so that different light functions and different light directions can be performed by this light.

This task is performed in the exterior rearview mirror of this type according to the exterior rearview mirror for vehicles, comprising a mirror housing, having at least one light window, behind which at least one light is disposed, comprising at least one illuminant, wherein the light passes through the light window to the outside, wherein at least a portion of the light is disposed adjustable#.

In the exterior rearview mirror according to the invention, at least a portion of the light is adjustable. Thereby, the light can perform different light functions, and/or can emit light in different directions. Thus, the light can be used for illuminating the lateral periphery of the roadway, close to the vehicle. In the solution according to the invention, a very large illuminated area becomes possible with only one light. In an advantageous manner, the light can be pivoted in two different directions, independent from each other, by means of a combined adjustment mechanism. Thereby, it is possible to use the light for multiple functions. The light can be used, for example, as a turn indicator, and as a position light, or as a day running light, or for lateral periphery illumination, or for several of these illumination types in combination.

When an exterior rearview mirror is folded towards the vehicle in parking position, the mirror head is typically pivoted towards the vehicle by means of a slanted separation between mirror base and mirror head, wherein the mirror head assumes a slightly slanted position. A light mounted in a rigid manner, significantly changes the light emission direction already by means of this slight slant. Contrary to that, a compensation is possible at the light according to the invention. The light can be pivoted accordingly by the angular amount to be corrected in one or two planes in this case. A fixed illuminant with a pivotable reflector can also be provided for a cost efficient form of this pivotable light.

As a cost efficient embodiment, the light can be provided integral with the light support. This combined unit, comprising the light and the light support, is advantageously disposed pivotable around the center axis of the light support in the mirror housing. Thus, an illumination is possible in a plane, which is orthogonal to the pivot axes of the light support.

In case of a light in a mirror housing, which is pivotable in one or two directions, the mechanics necessary for the adjustment can be provided as an optical eye catcher.

A sensor can certainly be used as a replacement for the light, or in combination with the light, wherein said sensor can perform peripheral detection in various directions according to the pivot angles of the light.

Further features of the invention can be derived from the additional claims, the description, and the drawings.

BRIEF DESCRIPTION OF THE DRAWINGS

The invention will now be described in more detail with reference to the some embodiments, illustrated in the drawings. It is shown in.

DETAILED DESCRIPTION OF THE DRAWINGS

Figure 1:
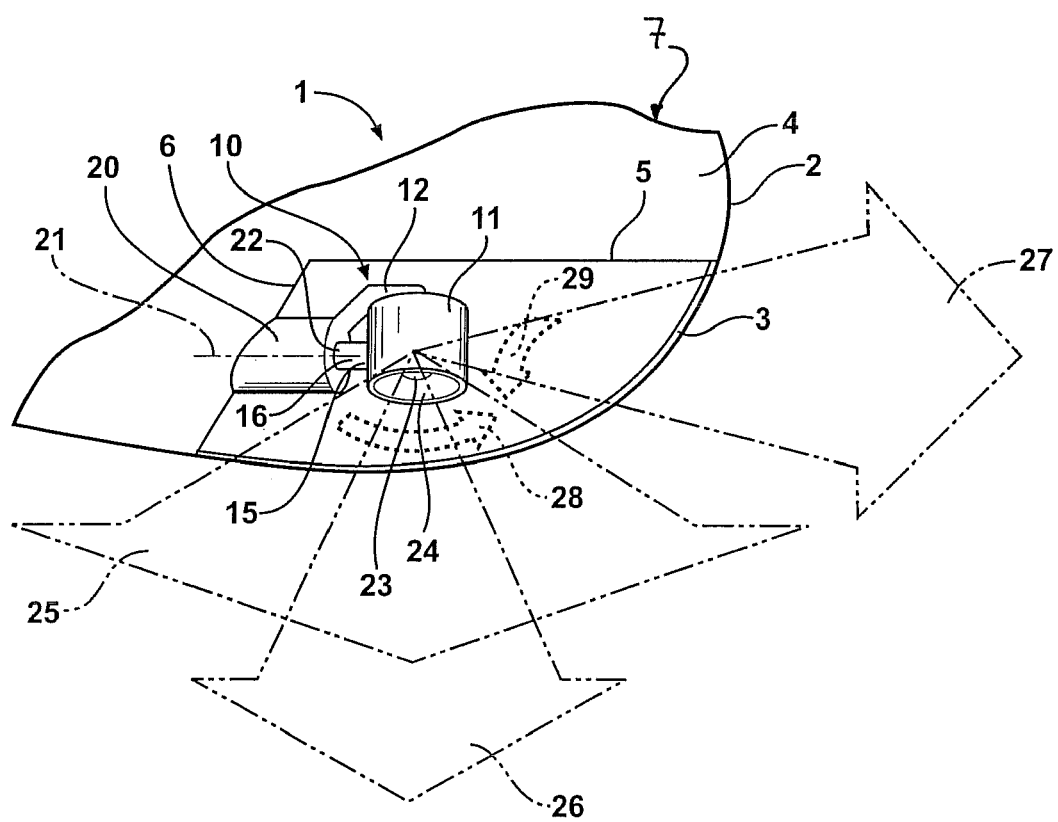
FIG. 1 a partial view of an adjustable light of an exterior rearview mirror according to the invention.

FIG. 1 shows a portion of an adjustable light 10, which is disposed in an exterior rearview mirror 1. It comprises a mirror base 30, by which it is mounted to the motor vehicle and a mirror head 7, which can be pivoted relative to the mirror base 30 in and against driving direction. A seam 35 (FIG. 2) extend therebetween. The mirror head 7 can thus be pivotable relative to the mirror base 30, herein around one axis in two directions (one axis mirror), or around two different axes (two axis mirror). In an advantageous manner, the mirror head 7 can also be foldable into a parking position, where it abuts to the side of the motor vehicle.

The mirror head 7 comprises a housing 2, in which a mirror glass is housed, which is adjustable in a known manner by means of a drive. The housing 2 has a light cavity 4, which is separated from a cavity, including the mirror glass, by means of a lateral boundary and an upper boundary 5, 6. The light cavity 4 is closed by a transparent light pane 3, which is inserted into an opening 8 of the housing 2, so that it forms a continuous extension of the housing 2.

The light 10 is disposed in the light cavity 4, which is pivotable around a horizontal and a vertical axis in the use position of the mirror head 7. In a first vertical illumination direction 26 (FIG. 1), the light 10 illuminates a roadway, laterally adjacent to the vehicle. In a second position, the light 10 is pivotable along arrow 29 into a horizontal illumination direction 25, in which it emits the light in the driving direction of the vehicle. From this position, or from the previous position, the light 10 can be pivoted along arrow 28 into a lateral illumination direction 27, so that adjacent vehicles or objects, like e.g. a garage wall, can be illuminated. Between these pivotable illumination directions 25 through 27, the light 10 can also assume any intermediate position, so that it is usable e.g. as a position light with a slightly slanted radiation angle. The light pane 3 is provided so that the light emitted by the light 10 goes outside in any pivot position.

Pivoting the light 10 into the three major light emission directions 25 through 27 is accomplished through a double articulated support of the light 10 at a respective adjustment mechanism. For this purpose, a light support 20 reaches through the lateral boundary 6 of the light cavity 4, wherein said light support is preferably provided cylindrical (FIG. 1) and rotatable around its longitudinal axis 21. The rotation axis 21 is disposed horizontal in the use position. The light support 20 is provided as a hollow body, in which a pushrod 22 is guided. It is supported at one end by an articulated joint 16 at an articulated joint flange 15, which is mounted to the exterior of the light 10. A support arm 12 connects to the front face of the light support 20, wherein said support arm is elbowed, so that it is connected through an articulated joint 14 with a joint flange 13 at the light 10. The two axes of the articulated joints 14, 16 are located in parallel with each other, offset relative to each other by 90° with reference to the light 10.

The light 10 has a tubular light housing 11, in which a reflector 24 is housed. In the focal point of the reflector 24, there is an illuminant 23, which can be provided as a glow bulb, LED, or similar.

Figure 2:
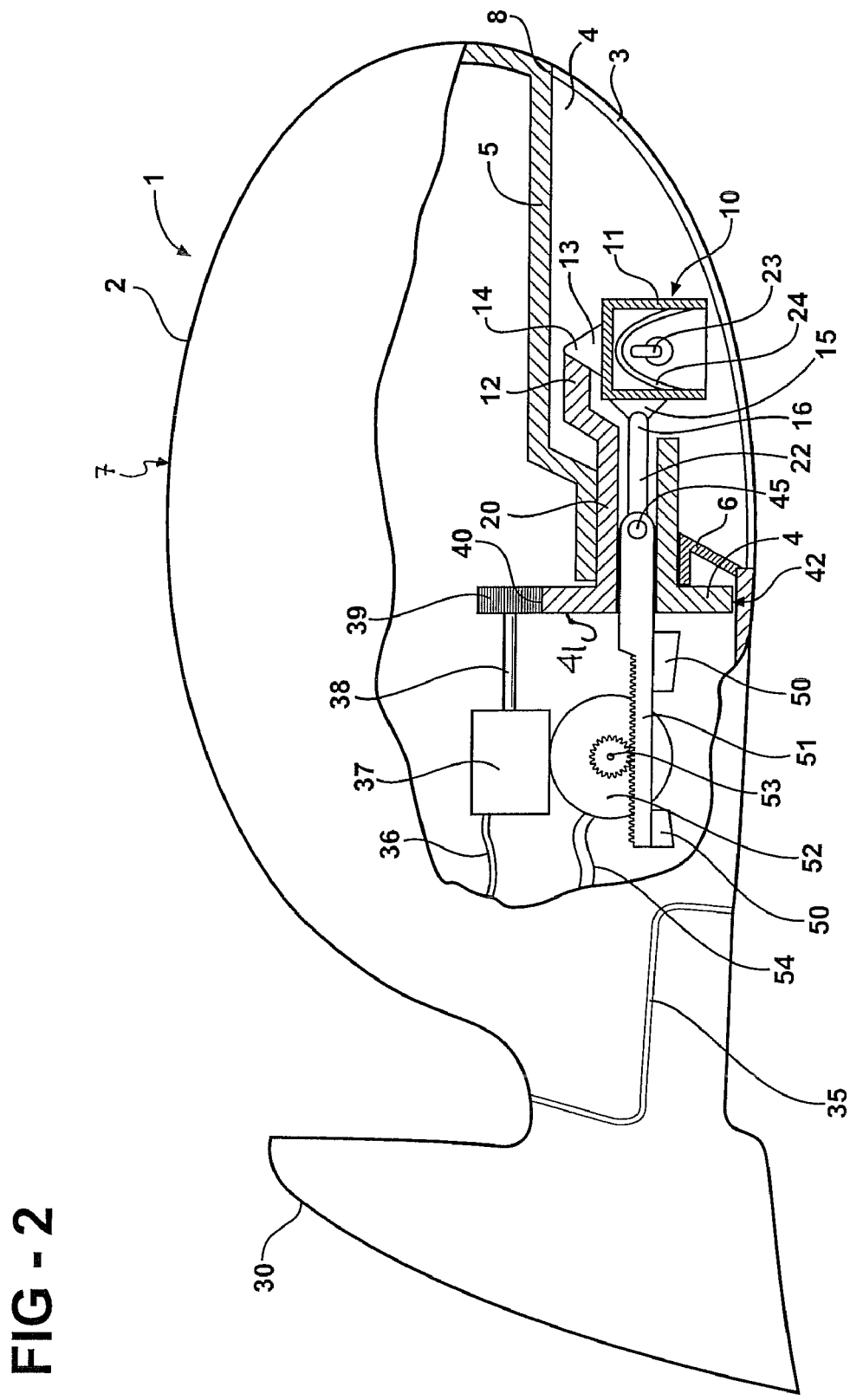
FIG. 2 a partial cut view and a partial perspective view of an adjustable light, comprising an adjustment device and a drive within the exterior rearview mirror according to the invention.

In the position according to FIG. 2, the illumination direction of the light 10 points vertically downward. If the light 10 is to be pivoted so that it emits its light forward in driving direction of the motor vehicle, the light support 20 is rotated around its axis 21 accordingly. Herein, the support arm 12 and the pushrod 22 pivot by the same angle, so that the light housing 11 is moved along accordingly. If the light 10 is to emit light in the lateral direction 27 (open FIG. 1), the pushrod 22 is moved in a direction towards the light 10. Thus, the light housing 11 pivots around the articulating joint 14, mounted in a rear portion. According to the linear travel of the pushrod 22, multiple angular positions can be assumed. Certainly, the light cavity 4 with the light pane 3 can be provided, so that also a light emission direction opposite to the driving direction can be facilitated.

Through these multiple adjustable light emission directions, the most different light functions can be adjusted. For example, in case of a horizontal light emission direction 25, forward in driving direction, the light 10 can be used as a day running light. In this position, and in intermediary positions, the light 10 can serve as position light. In case of a substantially lateral light emission direction 27, objects or obstacles, disposed next to the motor vehicle, can be illuminated as discussed. Such a side illumination can also be used as an additional aide when parking the vehicle. In case of the light function as a day running light, or position light, different color light can be used when employing a LED as illuminant 23. Thus, it is possible to use the light 10 by itself, or, for example, simultaneously with the day running light as a driving direction indicator.

In case of a substantially downward pointing illumination direction 26, the light 10 is also suitable as a doorstep light, or for lateral roadway illumination in the door area. When pivoting the light 10 in opposite direction, it can be used e.g. for illuminating the door handle. When the light 10 illuminates light in opposite direction to the driving direction, this light function can be used e.g. in risk situations, or emergencies as an additional warning light.

FIG. 2 shows an adjustable light 10 with the associated adjustment device and a drive within the mirror head 7. The light 10 is disposed in the light cavity 4 and comprises the tubular light housing 11 with the reflector 24, in whose focus the illuminant 23 is disposed. The light support 20 holds the light 10 by means of the support arm 12, at whose free end the light housing 11 is connected through the articulated joint 14 to its joint flange 13. The one end of the pushrod 22 is connected to the joint flange 15 through the articulated joint 16.

In order to pivot the light housing 11 to the side, the pushrod 22 is extended from the light support 20. For this purpose, the end of the pushrod 22, located in the light support 20, is connected to a gear rack 51 through an articulated joint 45. The gear rack 51 protrudes from the light support 20 and is in engagement with a sprocket 53 of an electric motor 52. It is disposed outside of the light cavity 4 within the housing 2 of the mirror head 7. Since the pushrod 22 is connected on the light side through the articulated joint 16 to the light housing 11, and on the gear rack side through the articulated joint 45 to the gear rack 51, a seizing of the light 10 or of the light housing 11 is avoided.

The gear rack 51 is guided by guides 50 outside of the light support 20, which are provided in the housing 2 of the mirror head 7.

When the gear rack 51 is moved towards the light 10, the pushrod 22 can assume a slanted position, adapted to the pivoting movement of the light 10. For this purpose, the articulating joint 45 is preferably provided as a ball joint. When pivoting in driving direction, the entire drive unit comprised of gear rack 51 and electrical motor 52 and the guides 50 for the gear rack 51 can remain in its installed position, through the use of a ball joint. Otherwise, when pivoting the light 10 in driving direction, the pushrod 22, the gear rack 51, the guides 50, and the drive motor 52 with the drive sprocket 53 would have to jointly perform the linear movement.

The light support 20 is rotatably supported in the lateral boundary 6 of the light cavity 4. At its end, facing away from the light 10, the light support 20 is provided with a flange 41, which has a teething 40 at its enveloping surface 42. It engages with the teething of a drive sprocket 39, which is connected through a drive shaft 38 with an electric motor 37, which is disposed in the housing 2 of the mirror head 7, outside of the light cavity 4.

Both electric motors 37, 52 can be controlled simultaneously, so that the light 10 can perform a combined movement through the pivoting of the light support 20, and through the linear movement of the gear rack 51. This way, any amount of intermediary positions can be adjusted according to the permissible pivot angles of the light 10. Such a combination of the movements is of interest, when the exterior rearview mirror is e.g. pivoted from an operating position into a parking position. Herein it is necessary for the position change of the exterior rearview mirror, for example, when the light 10 is used as a position light, to perform respective corrections of the light position.

It is furthermore conceivable to use the electric motors 37, 52 also as actuation drives for a mirror glass support. Each of these motors 37, 52 receives power from electrical connections 36, 54, respectively. Certainly, in such an embodiment, a respective connection to the mirror glass support via transmissions is required.

Another, not illustrated, cost effective mounting of the light 10 comprises connecting the articulating joint 14 of the light integrally through a film joint with the support arm 12. Eventually, the gear rack 51 and the pushrod 22 can be integrally provided as one component and connected to the light through a film joint, which is integrally formed during the manufacturing process. For using film joints, the provision of the light housing 11 and of the joints 14, 16, and also of the gear rack 51 and the light support 20 from plastic is advantageous. Herein, e.g. the gear rack 51 can be provided elastically deformable. The gear rack 51 is elastically bent during a lateral pivoting of the light 10, whereby a seizing during lateral pivoting of the light is avoided.

Figure 3:
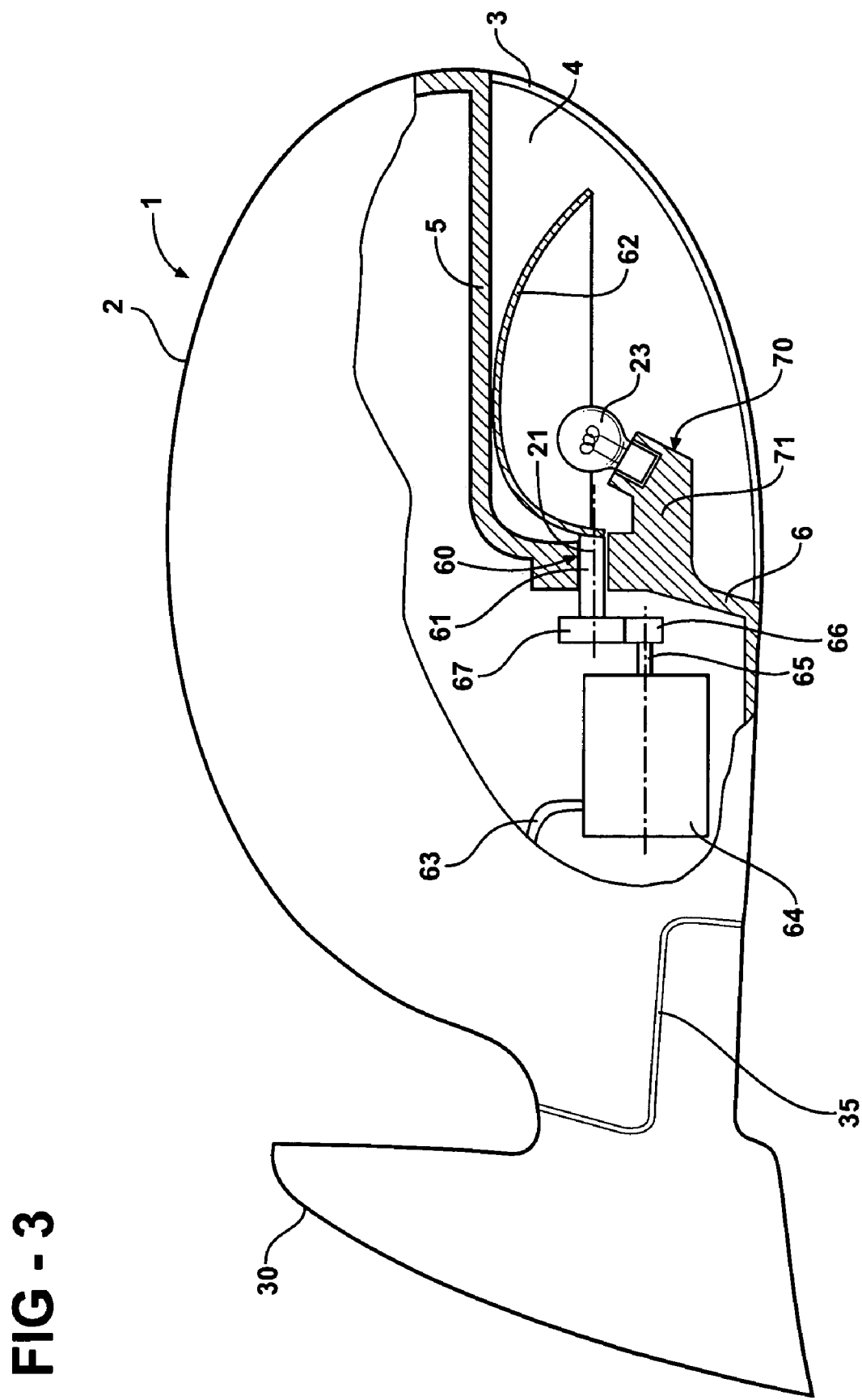
FIG. 3 another embodiment of the rearview mirror according to the invention in an illustration according to FIG. 2.

FIG. 3 shows a light 10 with an adjustable reflector 62 and associated adjustment device. From the lateral confinement 6, a holder arm 71 for an illuminant holder 70 for receiving the illuminant 23, protrudes laterally into the light cavity 4. The holder arm 71 is advantageously integrally formed with the confinement 6 and/or the light holder 70. In contrast to the embodiments according to FIGS. 1 and 2, the illuminant 23 is not pivoted. It is connected through the holder arm 71 and the illuminant holder 70 in a solid manner to the lateral confinement 6, and thus to the mirror housing 2. In order to allow a deflection of the light generated by the illuminant 23 in driving direction, or in a direction towards the roadway, disposed on the side of the vehicle, the reflector 62 is pivotable around the horizontal axis 21. The reflector 62 is mounted with its end facing the side of the vehicle to a cylindrical reflector support 61, whose longitudinal axis forms the rotation axis 21. The reflector support 61 is supported in the lateral confinement 6 in a support 60. The end of the reflector support 61, protruding from the light cavity 4, carries a gear 67, meshing with a drive sprocket 66 of a drive shaft 65 of an electric motor 64, electrically connected to the vehicle power via electrical connection 63. By means of this electric motor, the reflector support 61 can be rotated through the gear drive 66, 67 around the axis 21. The reflector 62 is pivoted accordingly. In this embodiment, the light generated by the illuminant 23 can only be directed in vertical direction, but not in lateral direction.

The light 10 according to FIG. 3 can be produced in a very simple and cost effective manner. It can illuminate the roadway area surrounding the vehicle, and it can also be used as a position light, or as a day running light.

Figure 4:
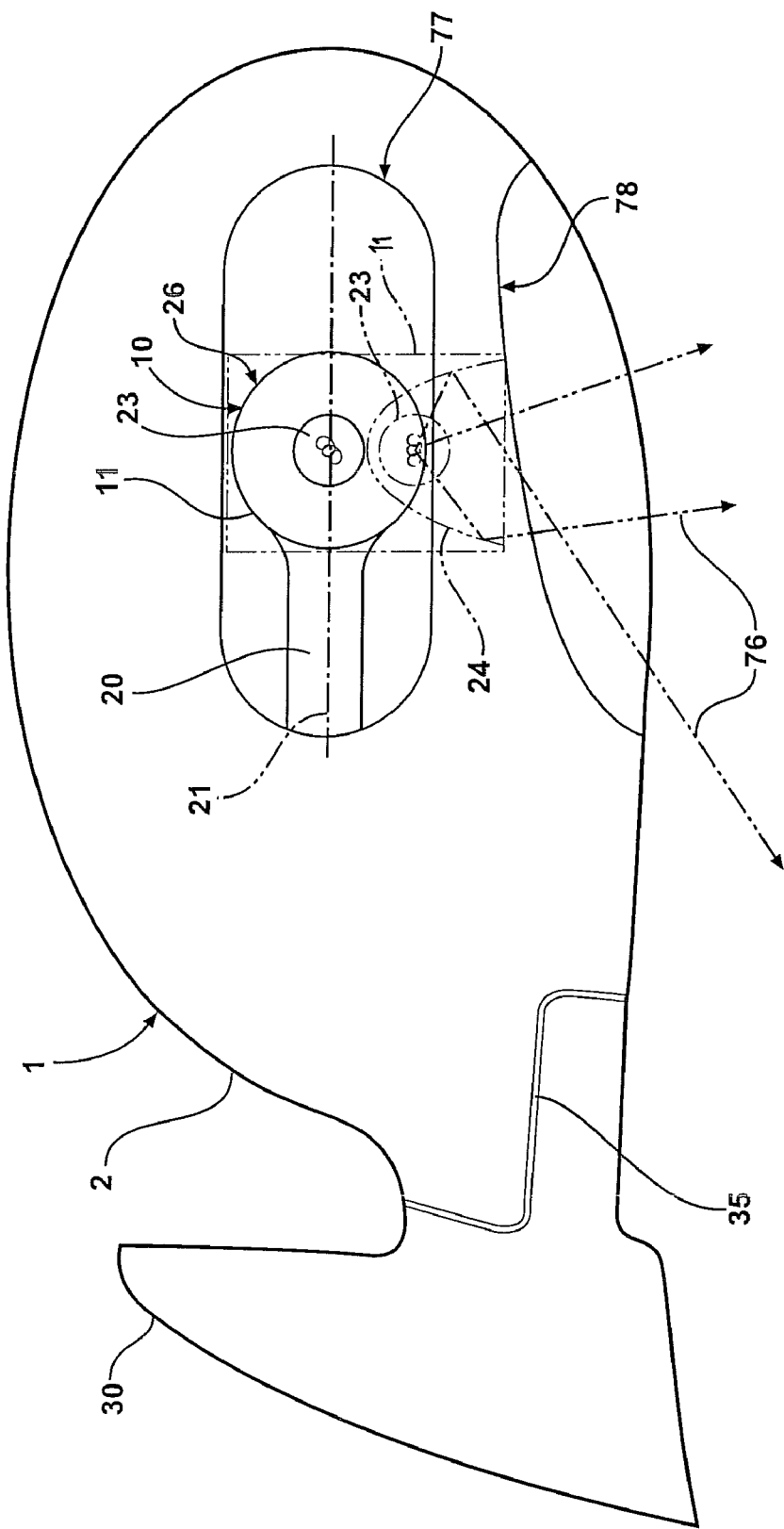
FIG. 4 another embodiment of an exterior rearview mirror in an illustration according to FIG. 2.
Figure 6:
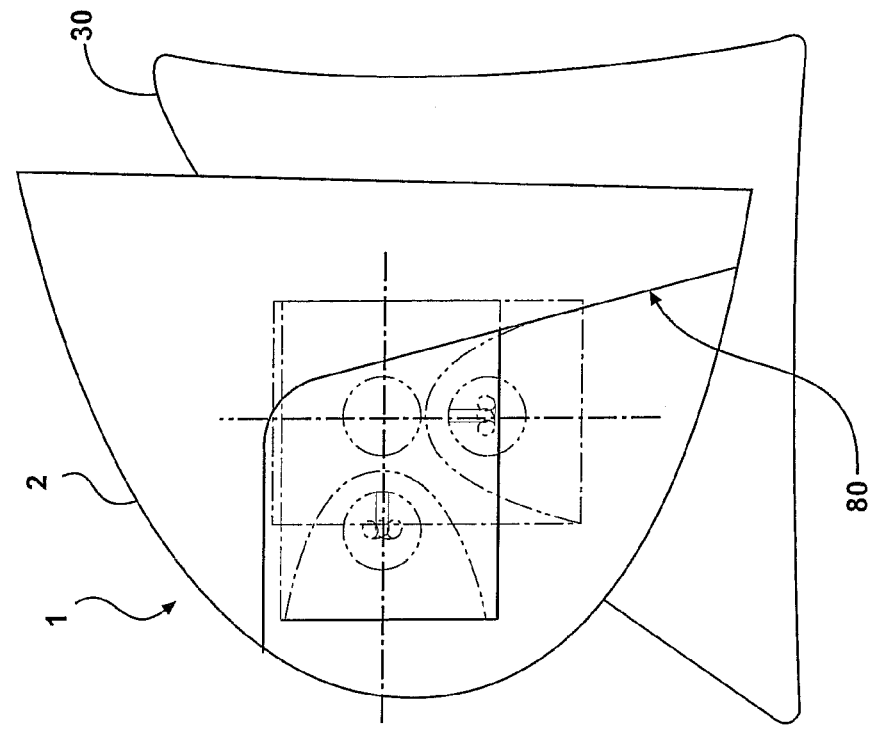
FIG. 6 a rearview mirror according to the invention in a side view, comprising a light window and a light, which is adjustable according to the opening angle of the light window.
Figure 5:
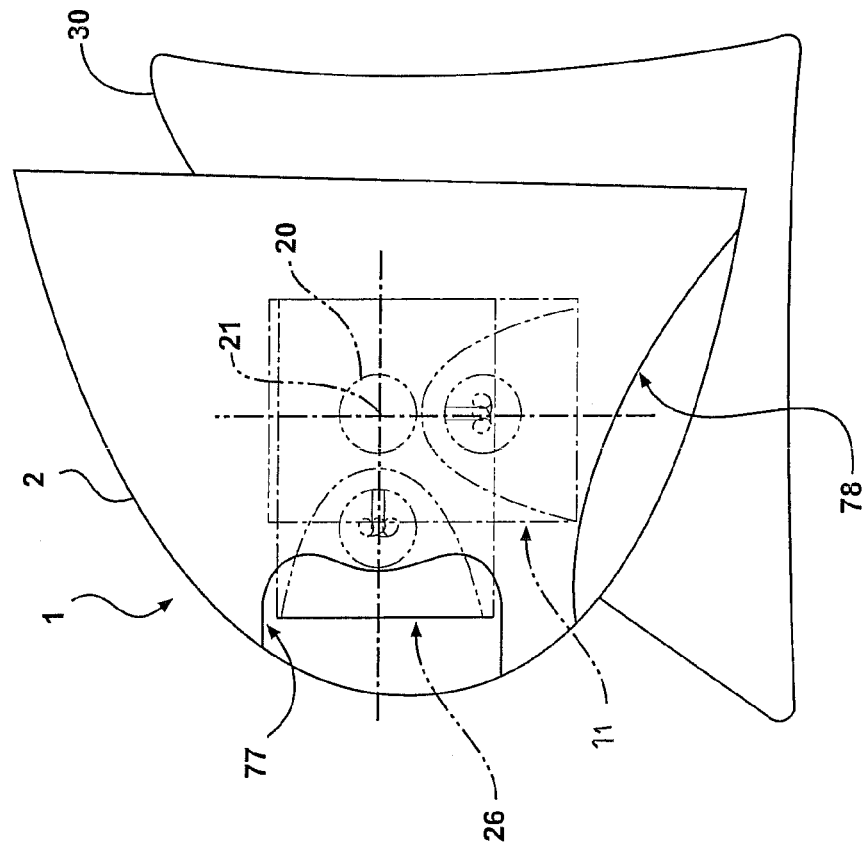
FIG. 5 the exterior rearview mirror, according to FIG. 4, in side view.

Another cost effective and simple embodiment is illustrated in FIGS. 4 through 6. The exterior rearview mirror 1 is provided with two light windows 77, 78 and a light 10, adjustable between them. It comprises the cylindrical housing 11 according to FIGS. 1 and 2. In the housing 11, the reflector 24 and the illuminant 23 are disposed. The housing 11 is provided at the light support 20, which is rotatable around the horizontal axis 21, pointing substantially towards the side of the vehicle. The illuminant support 20 extends from the light housing 11, substantially horizontal in the direction towards the mirror base 30. Since the light housing 11 is only rotatable around the horizontal axis 21, a lateral adjustment of the light 10 is not possible.

The light support 20 and the light 10 are advantageously provided integrally in one piece, wherein the light support is pivotably supported in the mirror housing 2. Preferably, the light 10 is only in operation, when the light is located in the radiation direction of one of the light windows 77, 78, illustrated in FIG. 4. The light beams 76, generated by the illuminant 23, are emitted to the outside by the reflector through the light windows 77, 78.

When the light housing 11 is pivoted, so that its longitudinal axis is disposed in the driving direction of the motor vehicle (solid lines in FIG. 4), then the light is only emitted through the light window 77. When the light housing 12 is pivoted downward around the axis 21, the light passes through the light window 78 to the outside. Since the light window 77 is provided in the rear wall of the mirror housing 2, the light is emitted forward in driving direction. The light window 78 is disposed approximately at the lower rim of the mirror housing 2. The exiting light passes through it downward onto the ground in the area next to the motor vehicle. When the light 10 is pivoted from the horizontal illumination position of the light window 77 into the lower position of the light window 78, no light is passed to the outside in the transition area between both light windows 77, 78. This can e.g. be accomplished through the mirror housing 2 being comprised of a nontransparent material, only translucent in the area of the light windows 77, 78, according to the size and shape of the light windows. The remaining mirror housing 2 can be provided with a non translucent surface coating. In another embodiment, cutouts for receiving fitted light panes of the light windows 77, 78 are provided in the non translucent mirror housing 2. In FIG. 5, the two described positions of the light 10 are illustrated.

According to FIG. 6, instead of the two light windows 77, 78, disposed at a distance from each other, a light permeable light pane 80 is provided, comprising the entire pivot range of the light 10. It is provided relatively large and in one piece and has the advantage that light from the light 10 can also get to the outside in intermediary positions. Thus, the light 10 can be adjusted, e.g. when the mirror head 7 is in parking position, so that the light is emitted through the light pane 80, downward onto the area next to the motor vehicle.

What is claimed is:

1. An exterior rearview mirror for vehicles, comprising a mirror housing, having at least one light window fixedly secured to the mirror housing and immovable with respect thereto, behind which at least one light source is disposed, comprising at least one illuminant, wherein light created by the illuminant passes through the light window to the outside, wherein at least a portion of the light source is disposed adjustable at two articulated joint locations, disposed at a distance relative to each other such that the at least one light source is pivotal about two separate axes.

2. A mirror according to claim 1, wherein the at least one light source is connected through an articulating joint location to a support arm and through the other articulating joint location to a pushrod in an articulating manner.

3. A rearview mirror according to claim 2, wherein the pushrod is connected at one end in an articulating manner to the at least one light source and at the other end in an articulating manner to a gear rack.

4. A mirror according to claim 3, wherein the articulated joint connection between the gear rack and the pushrod is formed by a ball joint.

5. A mirror according to claim 2, wherein the support arm for supporting the at least one light source is connected to a light support.

6. A mirror according to claim 2, wherein the support arm is rotatable by a rotation drive around its axis.

7. A mirror according to claim 6, wherein the support arm comprises a flange, which is provided with the gear rack at its enveloping surface.

8. A mirror according to claim 1, wherein a reflector of the at least one light source is adjustable.

9. A mirror according to claim 8, wherein the reflector is connected through a gear drive with a drive shaft of a drive motor.

* * * * *